United States Patent
Steyskal

Patent Number: 5,593,590
Date of Patent: Jan. 14, 1997

[54] PROCESS FOR SEPARATE TREATMENT AND DISPOSAL OF MIXTURES OF SOLID AND LIQUID, ORGANIC WASTES

[75] Inventor: Felix Steyskal, Vienna, Austria

[73] Assignee: Technoagrar Consulting AG, Vaduz, Liechtenstein

[21] Appl. No.: 107,827

[22] PCT Filed: Feb. 27, 1992

[86] PCT No.: PCT/EP92/00413

§ 371 Date: Aug. 26, 1993

§ 102(e) Date: Aug. 26, 1993

[87] PCT Pub. No.: WO93/13454

PCT Pub. Date: Aug. 7, 1993

[30] Foreign Application Priority Data

Feb. 27, 1991 [CH] Switzerland .................. 596/91

[51] Int. Cl.⁶ .................. C02F 3/28; C02F 11/12; C02F 11/14
[52] U.S. Cl. .................. 210/603; 210/604; 210/605; 210/607; 210/609; 210/630; 210/621; 210/631; 210/903; 210/906
[58] Field of Search .................. 210/603, 604, 210/605, 607, 609, 630, 631, 621, 903, 906

[56] References Cited

U.S. PATENT DOCUMENTS

| | | |
|---|---|---|
| 3,838,199 | 9/1974 | Coe . |
| 4,067,801 | 1/1978 | Ishida . |
| 4,198,211 | 4/1980 | Shattock . |
| 4,213,857 | 7/1980 | Ishida . |
| 4,252,901 | 2/1981 | Fischer . |
| 4,297,216 | 10/1981 | Ishida . |
| 4,354,936 | 10/1982 | Ishida . |
| 4,369,194 | 1/1983 | Arsovic . |
| 4,384,956 | 5/1983 | Mulder . |
| 4,416,779 | 11/1983 | Ripl . |
| 4,491,522 | 1/1985 | Ishida . |
| 4,500,429 | 2/1985 | Reimann . |
| 4,652,374 | 3/1987 | Cohen . |
| 4,710,300 | 12/1987 | Kristoufek . |
| 4,765,900 | 8/1988 | Schmoyer . |
| 4,839,052 | 6/1989 | Maree . |
| 4,867,883 | 9/1989 | Daigger . |
| 4,919,815 | 4/1990 | Copa . |
| 4,956,092 | 9/1990 | Blum . |
| 5,167,821 | 12/1992 | Tanbo . |
| 5,192,441 | 3/1993 | Sibony . |
| 5,213,681 | 5/1993 | Kos . |
| 5,275,732 | 1/1994 | Wang . |
| 5,294,348 | 3/1994 | Horney . |
| 5,337,898 | 8/1994 | Hamelers . |

FOREIGN PATENT DOCUMENTS

| | | |
|---|---|---|
| 265027 | 4/1988 | European Pat. Off. . |
| 396390 | 11/1990 | European Pat. Off. . |
| 2376827 | 8/1978 | France . |
| 2483946 | 12/1981 | France . |
| 3830332 | 3/1990 | Germany . |
| 19551 | 2/1979 | Japan . |
| 121560 | 9/1979 | Japan . |
| 127148 | 10/1979 | Japan . |
| 157387 | 12/1980 | Japan . |
| 89/12029 | 12/1989 | WIPO . |

Primary Examiner—Thomas M. Lithgow

[57] ABSTRACT

A starting mixture of liquid and solid organic wastes that is susceptible to at least partial microbiological degradation, with formation of biogas, is treated by the following process. The mixture is mechanically separated into a first sludge phase with enriched dry substance and a first liquid phase containing dilute solids. The first liquid phase is subjected to anaerobic treatment leading to formation of biogas and to the development of a second sludge phase and a second liquid phase. The first sludge phase is subjected to aerobic treatment resulting in the formation of compost, fertilizer, or feed. At least part of the second sludge phase is recirculated into the starting mixture, thereby causing the formation of biogas in the starting mixture and facilitating decomposition of higher compounds contained in the starting mixture.

10 Claims, 4 Drawing Sheets

PROCESS FOR SEPARATE TREATMENT AND DISPOSAL OF MIXTURES OF SOLID AND LIQUID, ORGANIC WASTES

BACKGROUND OF THE INVENTION

1. Field of the Invention

The invention relates to a process for the treatment of a starting mixture of liquid and solid organic wastes, which mixture is susceptible to at least partial microbiological degradation, with formation of biogas.

2. Description of Related Art

It has already been proposed (French Patent 2,541,669) to mix sludge obtained from the liquid phase of wastes by anaerobic fermentation (and optionally subsequent aerobic treatment) with the solid components intended for composting. However, this process has the disadvantage that separate thickening must be provided for relatively small amounts of sludge, or that undesirably large amounts of liquid are introduced into the composting.

Owing to its $CO_2$ content, it has already been proposed (EP-A1-0302852) to use engine exhaust gas, possibly from the combustion of biogas, for pH reduction in intermediate stages of fermentation or rotting. In the first case, expensive fuel gas or fuel oil must be used; in the second case, the $CO_2$ in any case present in the biogas is carried along as ballast and must be heated.

SUMMARY OF THE INVENTION

It is the object of the invention to provide a process in which these disadvantages are avoided, which surprisingly is achieved at least partially by the the following steps:

mechanically separating a starting mixture of liquid and solid wastes that is susceptible to at least partial microbiological degradation, with formation of biogas, into a first sludge phase with enriched dry substance and a first liquid phase containing dilute solids;

subjecting the first liquid phase to anaerobic treatment, leading to the formation of biogas and to the development of a second sludge phase and a second liquid phase;

subjecting the first sludge phase to aerobic treatment resulting in the formation of compost, fertilizer, or feed; and recirculating at least part of the second sludge phase into the starting mixture, thereby causing the formation of biogas in the starting mixture and facilitating decomposition of higher compounds contained in the starting mixture.

In the anaerobic treatment as well as in any subsequent aerobic treatment of the liquid phase, only a small amount of sludge is obtained; a not insignificant part of the organic wastes and the major part of the nitrogen and phosphorus remain dissolved, pollute the outflow sewer or the wastewater treatment plant and are lost to the production of fertilizers or the like.

It has therefore also been proposed to precipitate these substances from the liquid phase by chemical methods, in particular by flocculation; however, the resulting precipitate is either disposed of in a landfill or incinerated, once again both the groundwater and the atmosphere being polluted.

According to the invention, it has proven particularly expedient to absorb the $CO_2$ contained in the biogas in the starting mixture and/or in one of the subsequent liquid phases with simultaneous reduction of their pH; on the one hand, some of the 30 to 40% by volume of the $CO_2$ in the biogas is thus subjected to direct chemical reaction without detours and achieves an object for whose achievement special, expensive measures would otherwise be necessary; on the other hand, the biogas is enriched and thus attains a higher calorific value, i.e. becomes more valuable.

The precipitate obtained by chemical precipitation or flocculation in one of the liquid phases has to date been disposed of in a landfill or incinerated, as mentioned above; in connection with the genera of the process according to the invention, this precipitate—if necessary after thickening—can now be added to the solid components and/or—preferably—the starting mixture, with the result that not only is the pollution of the environment (groundwater, atmosphere) avoided but in addition the valuable substances (organic humus formers, nitrogen and phosphorous compounds) contained in the precipitate are retained and can be returned to the soil.

If—as is preferred—the precipitate is added to the starting mixture, its separation into liquid phase and solid components is facilitated, particularly when the substances involved are minerals containing trace elements and/or calcium carbonate, such as, for example, algal lime and/or kieselguhr, which can also be added directly to the starting mixture; there, they directly bind up to 20% of the nitrogen and phosphorus, so that only relatively small amounts of these components have to be removed from subsequent liquid phases.

The magnesium ammonium phosphate precipitation known per se has proven particularly expedient in connection with the process according to the invention; said precipitate can be incorporated in different variants: on the one hand, it can be carried out in such a way that even a very large amount of organic material is incorporated in the precipitate, which is then added to the starting mixture or to the solid components for further treatment. On the other hand, it may be desirable, after chemical precipitation or flocculation of the organic substances, to carry out the MAP precipitation only in the remaining supernatant liquid, with the result that an almost pure salt is obtained as crystals and can be sold at particularly high prices.

For the sake of completeness, it should also be mentioned that at least the $NH_4$ nitrogen may of course also be removed from the liquid phase by steam stripping, with the result that it is removed from the circulation; however, the resulting ammonium salt (generally sulfate or phosphate) can also be supplied as such to the fertilizer industry or can be added to the solid components either after they have rotted, in which case a mineral organic fertilizer forms, or, preferably, before they have rotted; in this case, at least a part of the nitrogen is organically bound and is present in the finished fertilizer in the highly desirable, organically bound form; in this form, it is released to the plants only slowly, precisely in the required amount, or is absorbed by said plants; in this case, expensive excess fertilizer, which also pollutes the groundwater, is also unnecessary.

BRIEF DESCRIPTION OF THE DRAWINGS

The invention will now be described in detail taken together with the drawings, in which.

The process according to the invention is illustrated in detail below using pig manure as an example; however, it is clear that it can also be applied to any other organic wastes or mixtures thereof, such as, for example, cattle manure, sewage sludge, whey, etc. Various process diagrams, which are shown in FIG. 1 to 9, serve for illustration. In the Figures, each circle denotes a liquid phase; a square denotes a solid or sludge phase and a dashed rectangle denotes a treatment stage.

DESCRIPTION OF PREFERRED EMBODIMENTS

Figure 1:
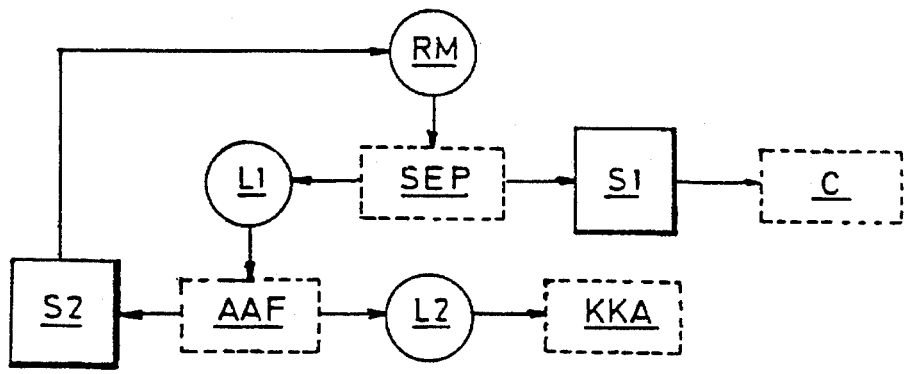
FIG. 1 is a diagram of a first variant of the process according to the invention.
Figure 2:
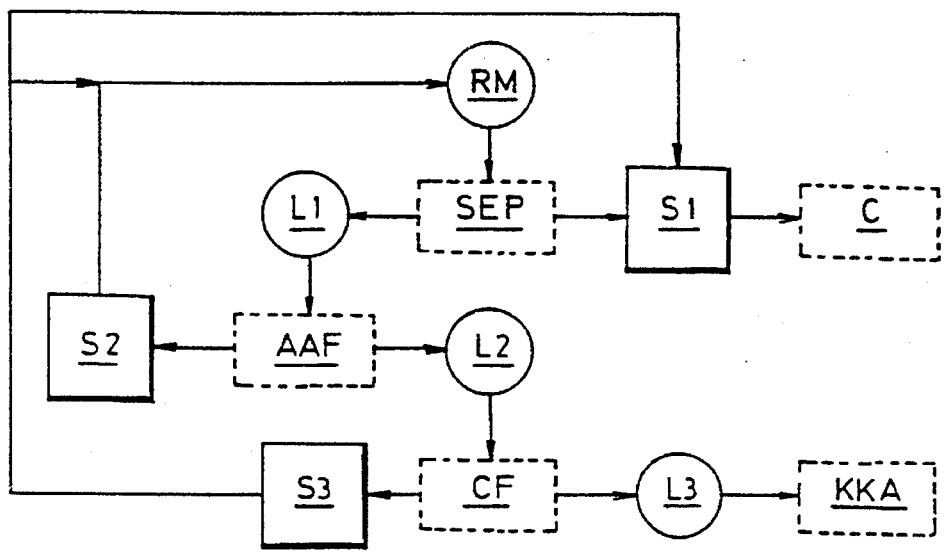
FIGS. 2–9 are diagrams of further variants of the process according to the invention.

The basic principle shown in FIG. 1 is common to all process variants in FIG. 2 to 8: the crude mixture RM is separated into a liquid phase L1 and a sludge S1 by means of a separation process SEP. This process is carried out, for example, by means of a screen-type centrifuge which is cheap in terms of capital costs and is not very susceptible to faults and furthermore consumes little energy, but brings the sludge S1 only to 20% dry substance. However, the use of a horizontal screw-type separator which is more than twice as expensive and has a sieve of 0.75 mm mesh size concentrates the sludge S1 to 35% dry substance. A decanter costing ten times as much, a closed, rapidly rotating screw, achieves 30% dried substance but a greater reduction of the solids in the liquid phase L1.

TABLE 1

Dirt load of pig manure in comparison with communal wastewater

| | Crude manure per pig | | | Communal wastewater per population equivalent | |
|---|---|---|---|---|---|
| | | | Amount (l/day) | | |
| | Range | Average | | | |
| | 3–10 | 8.3 | | 200 | |
| | Concentration (g/l) | | Total load | Concentration | Total load |
| | Range | Average | (g) | (mg/l) | (g) |
| COD | 30–90 | 50 | 415 | 600 | 120 |
| BOD5 | 10–40 | 25 | 207 | 300 | 60 |
| NH4—N | 4–4 | 2.5 | 20.8 | 60 | 12 |
| N tot | 3–7 | 3.5 | 29 | 100 | 20 |
| PO4—P | 0.2–1.2 | 0.6 | 5 | 30 | 6 |

TABLE 2

Dirt load of the first liquid phases per day
(with 160 m³ pig manure from almost 20,000 pigs)

| | RM (Crude mixture) | | L1 (after the separation SEP) | | L2 (after the anaerobic fermentation (AAF) | |
|---|---|---|---|---|---|---|
| | | | Amount (m³) | | | |
| | 160 | | 155 | | 150 | |
| | Concentration (g/l) | Total load (kg) | Concentration (g/l) | Total load (kg) | Concentration (g/l) | Total load (kg) |
| COD | 50 | 8000 | 4 | 6200 | 20 | 3000 |
| BOD5 | 25 | 4000 | 2 | 385 | 5 | 750 |
| NH4—N | 2.5 | 400 | 2.4 | 372 | 3 | 450 |
| N tot | 4 | 640 | 3.5 | 542.5 | 3.5 | 525 |
| PO4—P | 0.6 | 96 | 0.6 | 93 | 0.8 | 120 |

As can be seen from Table 2, only a slight reduction in the dirt load can be achieved by the separation alone. Nevertheless, it is not only advantageous but actually necessary: on the one hand, solids are obtained for the further, desired composting C and the dirt load is still somewhat reduced; on the other hand, the subsequent anaerobic fermentation AAF would be disturbed by formation of surface scum.

The liquid phase L1 is therefore now subjected to an anaerobic fermentation AAF, whose sludge S2 collecting in the bottom hopper of the reaction vessel (this is only 1 to 2% of the total throughput) and containing 5% of dry substance without separation (which is not worthwhile here) is recirculated to the crude mixture RM. Not only is biogas produced but higher compounds present in the pig manure are also decomposed.

Tables 1 and 2 show the dirt loads of liquid phases for the total organic substances as a COD value, for biodegradable organic substances therein as the BOD5 value, for the $NH_4$ nitrogen contained in the total nitrogen, and finally for the phosphorus content as phosphate ($PO_4$) phosphorus.

The resulting liquid phase L2 is still laden with about half the organic dirt load, the major part of which is poorly biodegradable, and with the total nitrogen and soluble phosphorus. It therefore still constitutes very severe pollution for a communal wastewater treatment plant KKA (FIG. 1).

A further step therefore consists in chemical precipitation or flocculation CF in the liquid phase L2. Depending on their composition and on the precipitaion method used (for example, 5 kg of algal lime and 30 l of a dilute polyelectrolyte mixture, such as, for example, Prestol® from Stockhausen), the sludge S3 which settles out after precipitation and may account for up to 30% of the amount of crude mixture and also contains about 10% of dry substance can be added again to the crude mixture RM, for example in a liquid manure storage tank, as can the sludge S2 from the anaerobic fermentation AAF; this results in the desired preliminary acidification there.

However, the sludge S3 can also be added to the sludge S1 for composting C (FIG. 2), particularly when very dry materials, such as, for example, straw, broiler droppings or the like are to be composted there.

Figure 3:
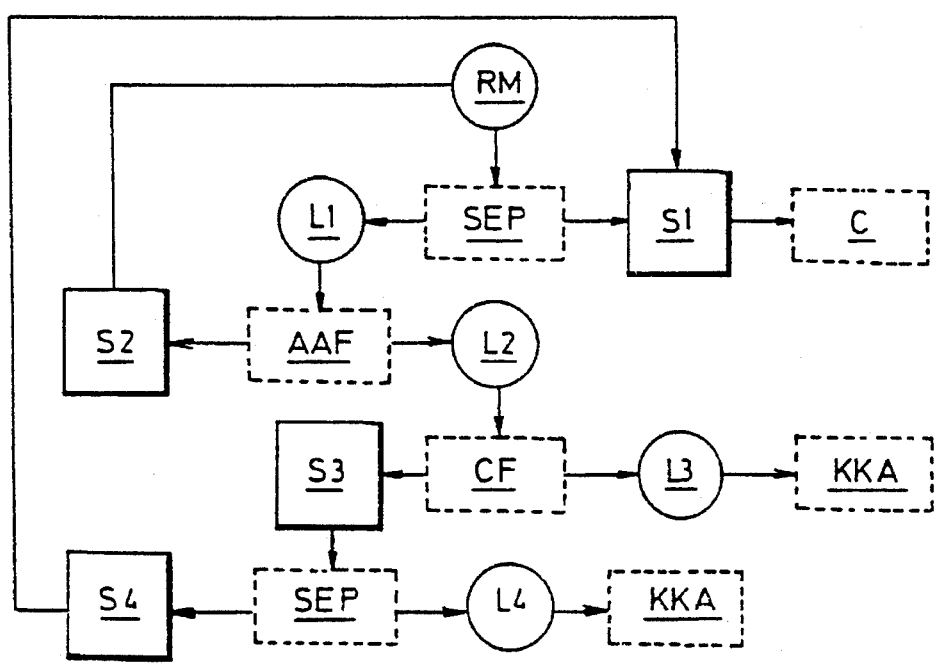

In other cases, however, it may be expedient further to thicken the sludge S3 by an additional separation, for example by means of a screw-type separator or a chamber filter press, or a screen press having a mesh size of only 0.02 mm, particularly when the sludge S3 is to be added directly to the sludge S1 for composting, which generally requires a minimum content of 40–50% of dry substance (FIG. 3). The resulting liquid phases L3 and L4 still contain the major part of the nitrogen; only the phosphorus has been substantially eliminated.

Known methods, such as, for example, the magnesium ammonium phosphate (MAP) precipitation or steam stripping, are used for nitrogen removal. On the other hand, the former method may also be used in place of the chemical precipitation CF (FIG. 4 and 5), in which case an amount of organic substances is entrained in the precipitate. In these cases, the dirt loads remaining in the liquid phase L3 are shown in Table 3. As can be seen, the chemical precipitation CF removes the organic substances better than the MAP; the latter, however, leaves behind a smaller amount of nitrogen in the liquid phase. This applies both in a procedure or in the case of an added amount of chemicals with an efficiency of only 80% and for the much more expensive procedure with 97% efficiency through the addition of a substantially larger amount of chemicals; the former will therefore generally be preferred.

TABLE 3

Dirt load of the liquid phases L3 per day
(with 160 m³ of pig manure from almost 20,000 pigs)

| | L3 (after chem. precipitation CF, FIG. 2 and 3) | | L3 (after the magnesium ammonium phosphate precipitation MAP, without CF) (FIG. 4 and 5) | | | |
|---|---|---|---|---|---|---|
| | | | with 80% efficiency | | with 97% efficiency | |
| Amount (m³) | 160 | | 155 | | 150 | |
| | Concentration (g/l) | Total load (kg) | Concentration (g/l) | Total load (kg) | Concentration (g/l) | Total load (kg) |
| COD | 5 | 700 | 12 | 1560 | 12 | 1560 |
| BOD5 | 1 | 140 | 3 | 390 | 3 | 390 |
| NH4—N | 2.6 | 364 | 0.5 | 65 | 0.1 | 13 |
| N tot | 3 | 420 | 1 | 130 | 0.5 | 65 |
| PO4—P | 0.1 | 14 | 0.1 | 13 | 0.05 | 6.5 |

Figure 6:
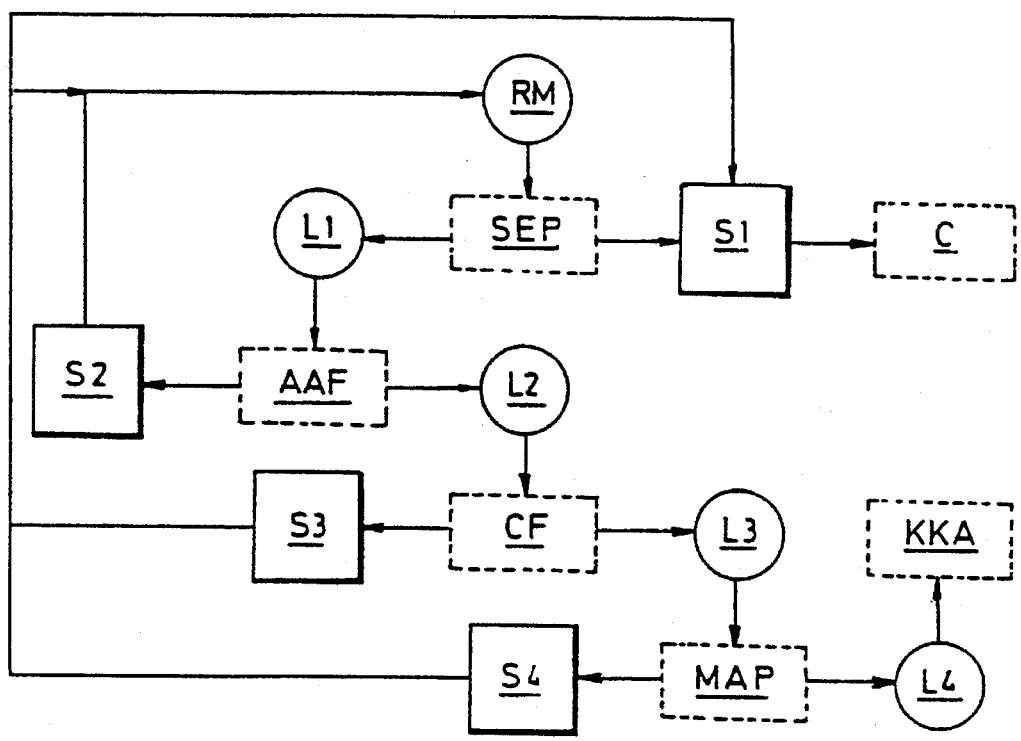

It is clear from this that an optimum can be achieved only by the combination of the two precipitation methods, as shown in FIG. 6, and the results of which are shown in Table 4. Also mentioned there are the values which remain after the purification by the activated sludge tank of a communal wastewater treatment plant for discharge of the final liquid phases into the main sewer: the remaining dirt load of the original liquid manure from 20,000 pigs corresponds to just 50 to 100 population equivalents.

TABLE 4

Dirt load per day in the liquid phase L3
and after a communal wastewater treatment plant
or an activated sludge tank with
160 m³ of crude manure from almost 20,000 pigs)

| | L3 (after chemical precipitation CF and the magnesium ammonium phosphate precipitation MAP (FIG. 6)) | | | | KKA (after the communal wastewater treatment plant) | |
|---|---|---|---|---|---|---|
| | with 80% efficiency | | with 97% efficiency | | | |
| Amount (m³) | 130 | | 130 | | | |
| | Concentration (g/l) | Total load (kg) | Concentration (g/l) | Total load (kg) | Concentration (g/l) | Total load (kg) |
| COD | 4 | 520 | 4 | 520 | 0.075 | 9.75 |
| BOD5 | 0.8 | 104 | 0.8 | 104 | 0.02 | 35 |
| NH4—N | 0.5 | 65 | 0.1 | 13 | 0.005 | 0.65 |
| N tot | 0.8 | 104 | 0.5 | 65 | 0.01 | 1.30 |
| PO4—P | 0.05 | 6 | 0.05 | 6.5 | 0.005 | 0.65 |

Figure 4:
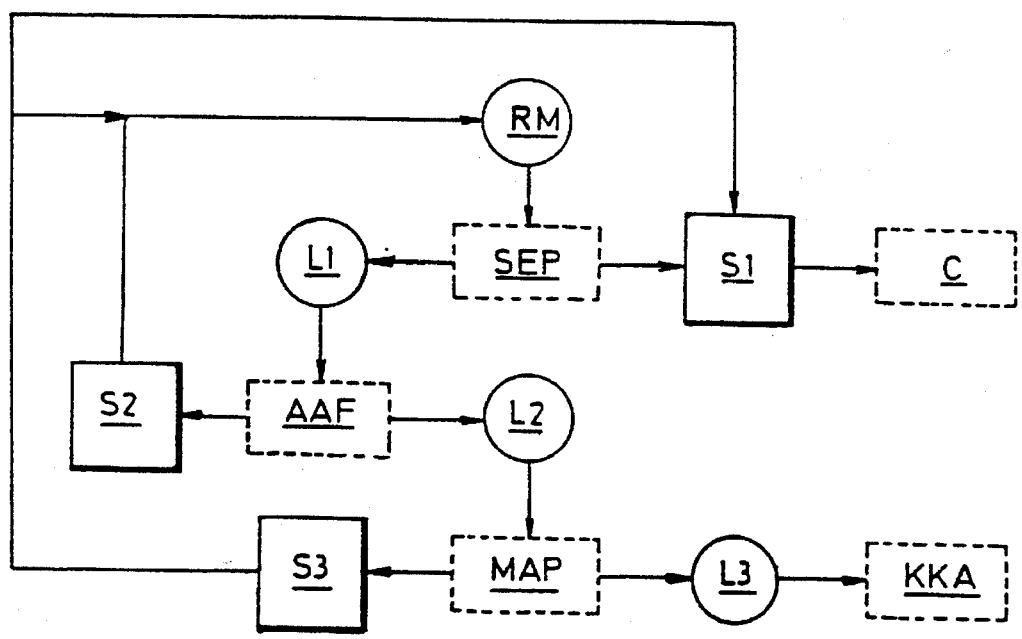
Figure 5:
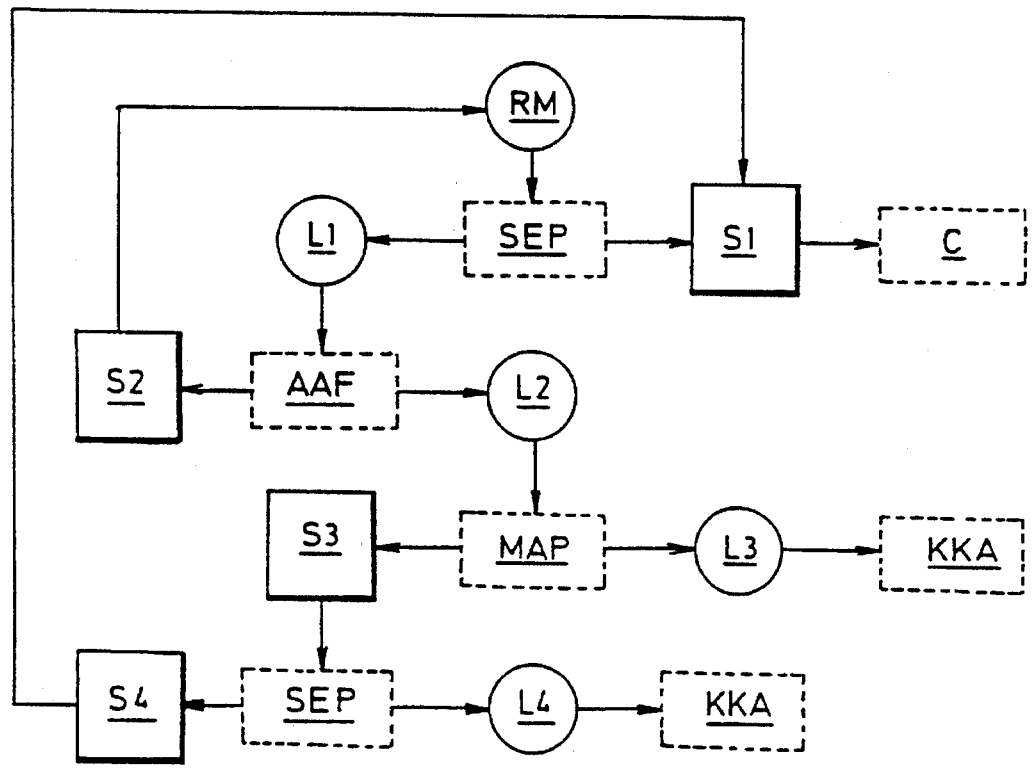

It is clear that, after the process described in FIG. 6, the sludge S3 (from the chemical precipitation CF) and/or the sludge S4 (from the MAP precipitation), each of which has only about 10% of dry substance, can, if desired, also be thickened via an additional separation step (not shown), analogously to the difference between FIG. 4 and 5. In this case, however, the concentrated sludge should on no account be mixed with the crude mixture but always with the sludge S1 intended for composting C.

Figure 7:
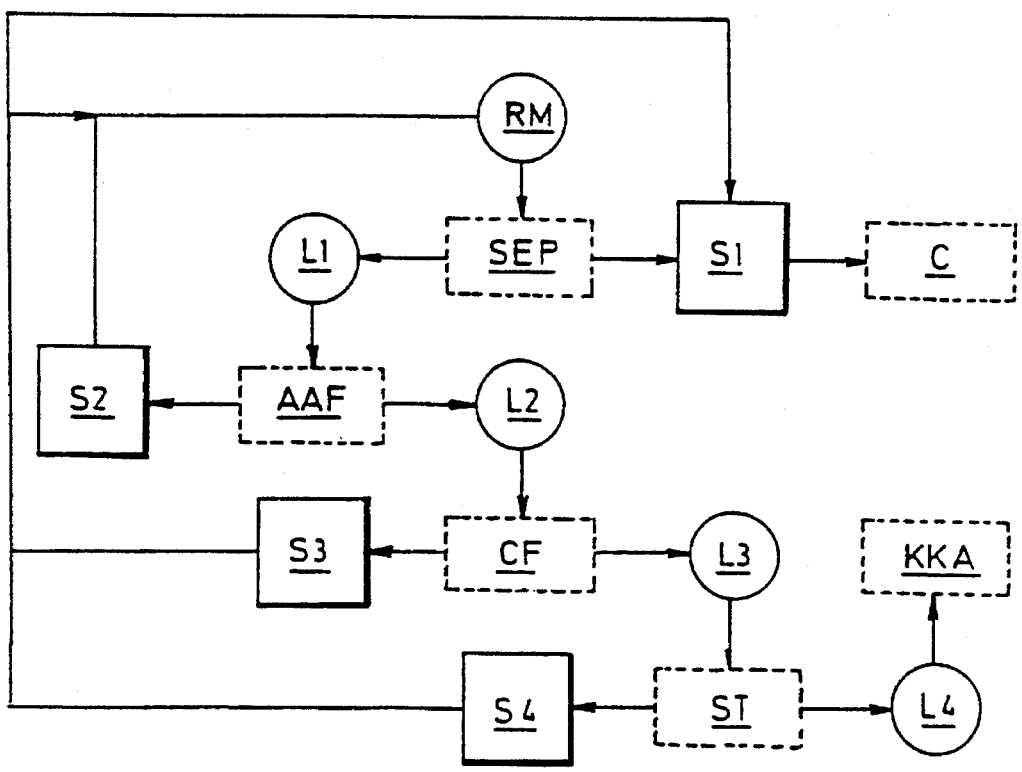

FIG. 7 shows a modification of FIG. 6: instead of the MAP precipitation, a steam stripping is carried out; this requires a pH of 9–10, which can be achieved, for example, by the addition of sodium hydroxide solution, but only at high costs; when lime is used, the sludge forming very soon blocks the packing in the reaction vessel. As an alternative, the cheap lime can nevertheless be added and this process step can also be combined with a chemical precipitation CF. In the stripping, ammonium sulfate is precipitated after the ammonia gas expelled has been passed into a container of sulfuric acid and is either sold as such or—as mentioned above—is mixed with the sludge S1 intended for composting.

Figure 8:
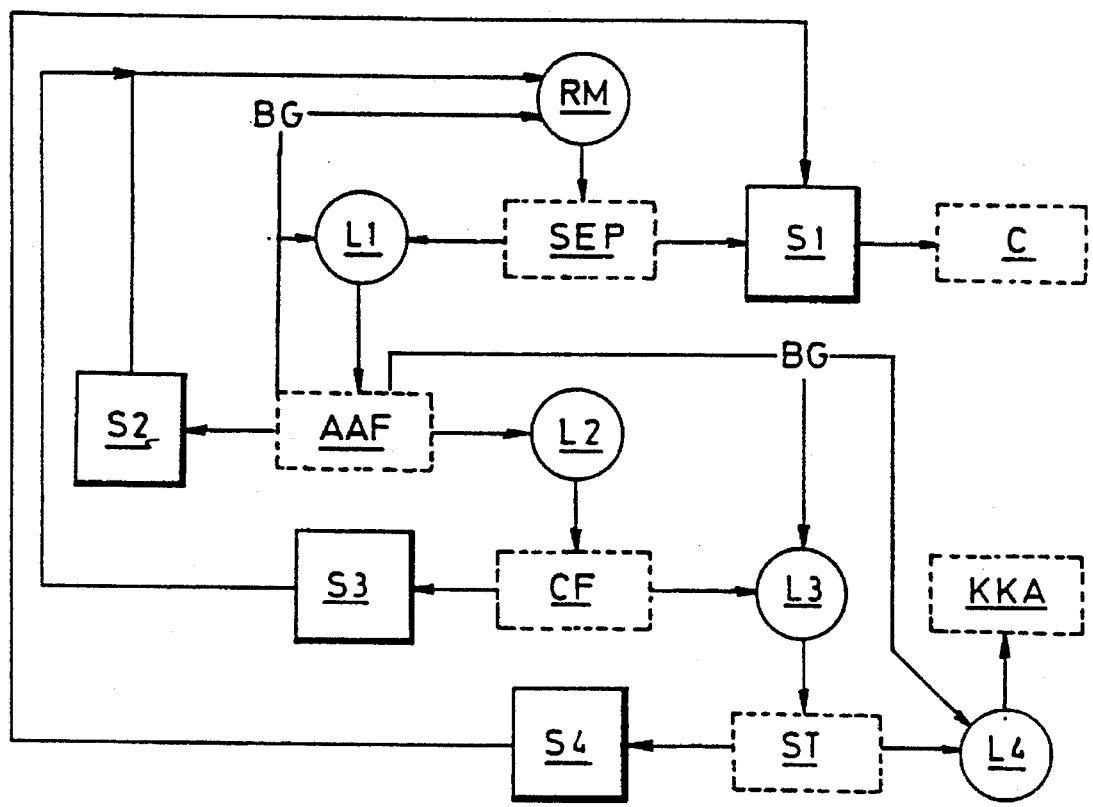
Figure 9:
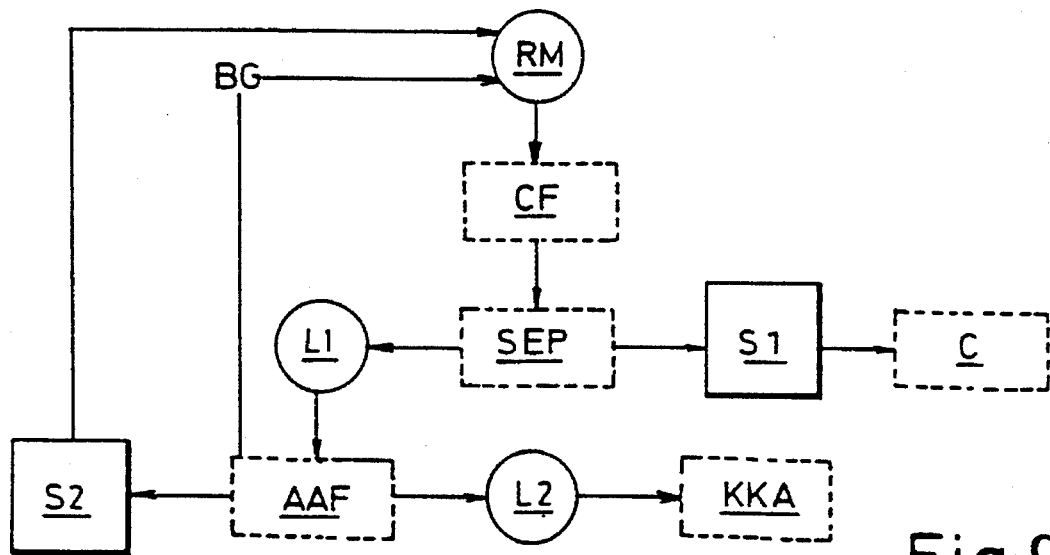

Finally, FIG. 8 and 9 illustrate those process steps according to the invention which are associated with the circulation of the biogas BG formed in the anaerobic fermentation AAF. Excess biogas BG is always used (not shown) for energy recovery, in a manner known per se. Depending on the duration of the anaerobic fermentation AAF, the amount and quality of the biogas BG produced can be controlled so that the entire process runs in a self-sufficient manner, i.e. the amount of biogas produced (60–70% methane) is exactly the same as that required for the drying and the energy consumption. Depending on requirements, the waste heat is used for heating the crude mixture RM before the anaerobic fermentation AAF and hence ensuring that said crude mixture has better reactivity, or for heating the reactor.

In a process according to FIG. 8, biogas BG is added for direct acidification to the first liquid phase L1 and/or to the crude mixture RM and always to the final liquid phase L4 after the stripping ST, which phase is obtained with a pH of 9–10 and therefore can on no account be discharged into the communal wastewater treatment plant. The sludges S3 and/or S4 are further treated by one of the processes according to FIG. 2 to 7.

Finally, FIG. 9 shows a process in which, in contrast to all processes described above, the crude mixture RM acidified by means of biogas BG is subjected, prior to the separation SEP, to a chemical precipitation which has thus been improved or facilitated.

This procedure permits particularly good control of the amount and quality of the biogas BG obtained. While, for example, 1 m³ of the crude pig manure gives 15 m³ of biogas in 10 days and 20 m³ of biogas in 15 days with normal anaerobic fermentation AAF, only 9 m³ of biogas are formed in 15 days after prior chemical precipitation CF, because less organic substance now remains in the liquid phase after the separation SEP; it is thus also possible to manage with smaller reactors and the capital costs are therefore lower. However, an additional energy resource may have to be considered if the calorific value of the gas is no longer sufficient.

The common feature of all processes illustrated is that the final liquid phase L3 or L4 can be fed to a further wastewater treatment, for example to a separately installed activated sludge tank, instead of being fed to a communal wastewater treatment plant; however, the liquid phases can be used at least partially for the cleaning of animal sheds in place of fresh water and are thus circulated, the remaining dirt load components being removed in the next chemical precipitation.

However, under certain circumstances and at certain times of the year, it is also possible to consider applying the partially sanitized liquid phases L3 or L4 in agriculture, for example by spraying.

I claim:

1. A process for the treatment of a starting mixture of liquid and solid organic wastes, said mixture being susceptible to at least partial micro biological degradation, with formation of biogas, the process comprising:

separating said starting mixture into a first sludge phase with enriched dry substance and a first liquid phase containing dilute solids;

subjecting said first liquid phase to anaerobic treatment, said treatment leading to said formation of biogas and to the development of a second sludge and a second liquid phase; and subjecting said first sludge phase to aerobic treatment resulting in the formation of a product wherein the product is compost, fertilizer or feed;

the process further comprising:

recirculating at least part of said second sludge phase into said starting mixture, thereby causing the formation of biogas in said starting mixture, and recirculating at least part of said biogas obtained from said anaerobic treatment of the first liquid phase into said starting mixture, thereby reducing the pH of said starting mixture by absorption of carbon dioxide contained in said biogas.

2. A process according to claim 1, further comprising adding to said second liquid phase at least one agent selected from the group consisting of a precipitating agent and a flocculating agent and subjecting the second liquid phase with said agent to a flocculating or precipitating step thereby yielding a third sludge phase and a third liquid phase, and recirculating at least part of said third sludge phase to said starting mixture.

3. A process according to claim 1, further comprising adding to said second liquid phase at least one agent selected from the group consisting of a precipitating agent and a flocculating agent and subjecting the second liquid phase with said agent to a flocculating or precipitating step thereby yielding a third sludge phase and a third liquid phase, and recirculating at least part of said third sludge phase to said starting mixture and said first sludge phase.

4. A process according to claim 1, further comprising adding to said second liquid phase at least one agent selected from the group consisting of a precipitating agent and a flocculating agent and subjecting the second liquid phase with said agent to a flocculating or precipitating step thereby yielding a third sludge phase and a third liquid phase, and subjecting said third sludge phase to a thickening step yielding a fourth sludge phase and fourth liquid phase, at least part of said fourth sludge phase being recirculated to said first sludge phase.

5. A process according to claim 1, further comprising adding to said second liquid phase at least one agent selected from the group consisting of a precipitating agent and a flocculating agent and subjecting the second liquid phase with said agent to a flocculating of precipitating step thereby yielding a third sludge phase and a third liquid phase, recirculating at least part of said third sludge phase to said starting mixture, and subjecting the third liquid phase with said agent to a magnesium ammonium phosphate precipitating step thereby yielding a fourth sludge phase and fourth liquid phase, and recirculating at least part of said fourth sludge phase to said starting mixture.

6. A process according to claim 1, further comprising adding to said second liquid phase at least one agent selected from the group consisting of a precipitating agent and a flocculating agent and subjecting the second liquid phase with said agent to a flocculating or precipitating step thereby yielding a third sludge phase and a third liquid phase, and subjecting the third liquid phase with said agent to a magnesium ammonium phosphate precipitating step thereby yielding a fourth sludge phase and a fourth liquid phase, and recirculating at least part of said fourth sludge phase to said first sludge phase.

7. A process according to claim 1, further comprising adding to said second liquid phase at least one agent selected from the group consisting of a precipitating agent and a flocculating agent and subjecting the a second liquid phase with said agent to a flocculating or precipitating step thereby yielding a third sludge phase and a third liquid phase, recirculating at least part of said third sludge phase to said starting mixture, and said first sludge phase, and subjecting said third liquid phase to a stripping procedure, thereby yielding a fourth sludge phase being at least partly recirculated to said starting mixture, and a fourth liquid phase with a reduced concentration of ammonia nitrogen.

8. A process according to claim 1, further comprising adding to said second liquid phase at least one agent selected from the group consisting of a subjecting the second liquid phase with said agent to a flocculating or precipitating step thereby yielding a third sludge phase and a third liquid phase, recirculating at least part of said third sludge phase to said starting mixture, and said first sludge phase, and subjecting said third liquid phase to a stripping procedure, thereby yielding a fourth sludge phase being at least partly recirculated to said first sludge phase, and a fourth liquid phase with a reduced amount of ammonia nitrogen.

9. A process according to claim 2, wherein said flocculating agent is a polyelectrolyte in combination with a mineral containing at least one agent selected from the group consisting of calcium carbonate, algal lime and kieselgur.

10. A process according to claim 1, further comprising recirculating at least part of said biogas into said first liquid phase.

* * * * *